Dec. 16, 1969 J. M. LOEB 3,483,753

GRAVITY METER OF THE VIBRATING WIRE TYPE

Filed Feb. 16, 1968

3,483,753
GRAVITY METER OF THE VIBRATING
WIRE TYPE
Julien M. Loeb, Saint-Cloud, France, assignor to Compagnie Generale de Geophysique, Paris, France, a corporation of France
Filed Feb. 16, 1968, Ser. No. 706,049
Claims priority, application France, Feb. 20, 1967, 95,564
Int. Cl. G01m 1/12; G01p 15/08
U.S. Cl. 73—382                 2 Claims

ABSTRACT OF THE DISCLOSURE

A gravity meter of the tensioned vibrating wire type, wherein the influence of the vertical component of the acceleration (including a spurious component due to the motion of the vehicle and the desired gravimetric component) is cancelled out by a feedback system. The value of the force applied by the feedback system is a linear combination of desired and spurious components which can validly be taken as the input of a filter device which eliminates the spurious component.

---

It is well-known to measure the intensity of the terrestrial gravitational field with gravity meters including chiefly a mass suspended from a wire, to tension the latter.

It is also well-known that the frequency of transverse waves progressing along such wires is a function of the tension to which the wire is subjected. Consequently, this frequency is a measure of the intensity of the terrestrial gravitational field at a predetermined point, since the mass secured to the end of the wire does not vary with time nor does it vary from one point to another.

It has also been proposed to measure said frequency by resorting standpoint, from an electrical standpoint, to the vibrating wire as a resonating member inserted in the reaction loop of an amplifier which is thus transformed into an oscillator the frequency of the oscillations of which is equal to the resonant frequency of the transverse waves progressing along the vibrating wire.

This frequency can be readily measured with the desired accuracy and consequently the desired result can be reached since it is an easy matter to ascertain the relationship between the frequency thus measured and the intensity of the gravitational field. In fact, a gravity meter executing such a method when used on land, that is on a stationary surface which does not change during operation, provides satisfactory results.

In contradistinction, such a gravity meter when used as is on board a ship or the like moving part with a view to measuring the gravitational field at sea, for instance, has only led to disappointment. It is true that it is possible to set the gravity meter on a stabilized platform, so that the rolling and pitching of the movable part cannot disturb the angular setting of the gravity meter with reference to a vertical line, but it has not been possible to prevent the gavity meter as a whole from executing translational movements caused by the movements of the moving vehicle carrying it. In fact, the vertical component of such translational movements is such that the instantaneous tension to which the vibrating wire is subjected is equal to the tension produced by gravity with the addition or subtraction, according to the moment considered, of the tension ascribable to said vertical component of the acceleration of the translational movement to which the gravity meter is subjected.

One might imagine it is possible to take the average of the measurement made during a lapse of time equal to a number of periods of the oscillatory movement of the moving vehicle, so as to eliminate the action of such periodical translational movements. However, a more accurate analysis of the facts shows that this is impossible since the frequency of the oscillations of the vibrating wire is not a linear function of the tension exerted on it and is actually a quadratic function of said tension. In other words, the resonant frequency of the vibrating wire is defined at least as a first approximation by the instantaneous tension exerted on said wire as shown by the equation:

$$f = a\sqrt{T}$$

$f$ being the resonant frequency, $a$ a coefficient of proportionality and $T$ the instantaneous tension to which the wire is subjected On the other hand $$T = M(g + \Delta g + \gamma)$$

$g$ being the normal intensity of gravity, say 980 gals, $M$ the mass secured to the wire, $\Delta g$ the difference between the normal value $g$ of gravimetric intensity and its actual value at the point where it is being measured and $\gamma$ the vertical component of the acceleration ascribable to the vertical translational movements of the gravity meter. The value of said last component may become several thousand times larger than the value $\Delta g$ which it is desired to ascertain.

The above equations show that $$f = a\sqrt{M(g + \Delta g + \gamma)}$$

Said quadratic relationship between $f$, $\Delta g$ and $\gamma$ shows it is impossible to remove the influence of $\gamma$ by a linear filtering applied to the frequency $f$.

The present invention has for its object to remove this drawback and reaches the desired result by resorting to a method relying no longer on frequency alone, but on the incorporation with the gravity meter of a feedback system associating with the tension stress exerted on the wire an auxiliary transient supplementary force adapted to return permanently the total fractional stress exerted on the wire to its accurate value, that is the value obtained when the mass acting on the wire is subjected only to the normal value of gravity. This provides the well-known advantages inherent to the called "zero method."

Preferably, this application of an auxiliary compensating force is performed electromagnetically and the electric current required for producing such an auxiliary force forms a measure of the auxiliary force exerted on the wire. The intensity of said current is a linear function of the instantaneous value of said auxiliary force and it has two components, to wit: a D.C. component which is actually proportional to the value of $\Delta g$ and an A.C. component generated by the acceleration of $\gamma$ which it is now possible to eleminate by filtering since the phenomena considered are of a linear type.

I will now describe my invention in further detail, reference being made to the accompanying drawings whereof:

Figure 1:
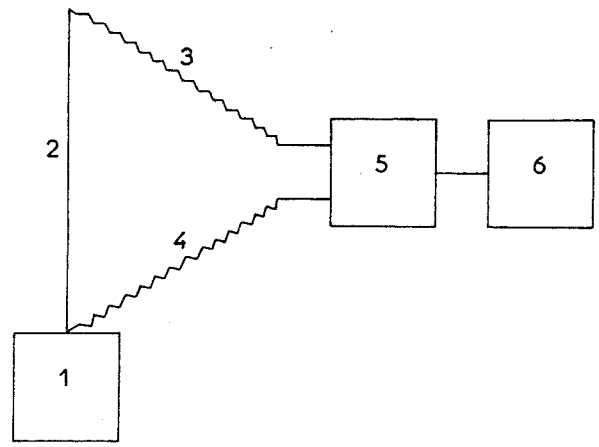
FIG. 1 is the diagram of a conventional gravity meter of the vibratory wire type.

As illustrated in FIG. 1, a conventional gravity meter of the vibrating wire type includes a mass 1 suspended from a vibratory wire 2, the opposite ends of which are connected through corresponding yielding leads 3 and 4 with the input of an amplifier 5 provided with a feedback device producing sustained oscillations incorporating a resonating part, which is constituted by the wire 2 so that the system 2—5 forms a generator oscillating at the frequency of the transverse oscillations of the wire. The instantaneous frequency obtained at the output of the amplifier 5 is measured by any suitable means illustrated at 6.

Figure 2:
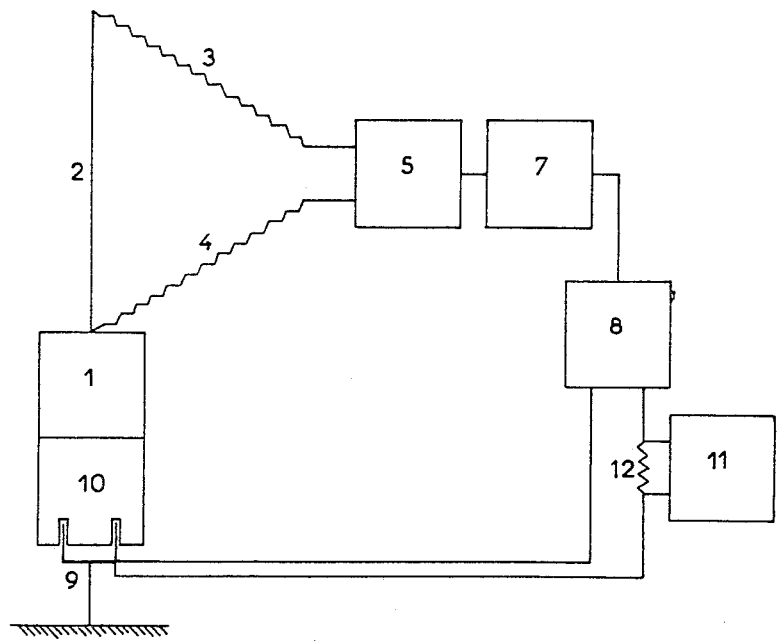
FIG. 2 is a modification thereof incorporating my invention.

The gravity meter illustrated in FIG. 2 and improved in accordance with my invention includes the same components 1, 2, 3, 4 and 5 which play the same part as the components carrying the same reference numbers in FIG. 1.

Instead of measuring the frequency of the oscillations provided by the generator 2—5, said oscillations are fed into a frequency discriminator 7 of which the output supplies D.C. voltage proportional to the difference between the value of the oscillations at the output of the generator 2—5 when the mass 1 is subjected solely to the reference value g and the instantaneous value of said frequency at any considered moment, i.e., taking into account the intensity of gravity at such a moment, the movements of the gravity meter and the part played by the electrodynamic feedback system 9—10 described hereinafter. The voltage at the output of the discriminator 7 is amplified by the amplifier 8 and the output of which feeds a winding 9 secured to the frame of the gravity meter; said winding 9 is housed in a radial magnetic field produced by permanent magnets including pole-pieces 10, which magnets and pole-pieces are rigidly secured to the mass 1 weighting the wire 2 and form thus mechanically part of said mass.

The mass 1 is suitably held fast in a lateral direction by suitable means.

The electrodynamic system 9—10 is similar to that of loudspeakers of radio-receivers and it is apparent that there is thus obtained a loop such that the intensity of the current fed into the winding 9 is such that its electrodynamic action returns accurately the transient tension exerted on the wire 2 to the value it shows when the mass 1-10 is subjected to the sole action of the standard value of gravity, such a result being achieved by resorting to an amplifier 5 providing a sufficient gain.

Consequently, there is obtained a linear relationship between the intensity I of said current feeding the winding 9 and the terms $\Delta g$ and $\gamma$ or otherwise expressed:

$$I = b(\Delta g + \gamma)$$

$b$ being a constant.

Now, during a measurement $\Delta g$ does not practically vary and it is thus analogous to a D.C. component whereas $\gamma$ which is the acceleration produced by the movement of the vehicle carrying the gravity meter can hardly be ascertained accurately although it is always certain that its period is at the utmost equal to the magnitude of the period of the movements of the vehicle, say a few seconds. It is therefore possible to use a filter 11 with a view to separating the component $\Delta g$ and to eliminate the component produced by $\gamma$. It is thus possible to measure at the output of the filter 11 the value of $\Delta g$ without any influence of $\gamma$. To reach this result, it is possible, for instance, to feed the filter 11 with the voltage tapped off across the terminals of a resistance 12 inserted in series in one of the leads connecting 8 with 9.

Obviously, many details of the arrangement disclosed may be modified within the scope of the invention as defined in the accompanying claims. In particular, it is possible to substitute for the electromagnetic motor 9—10 energized by the output of the amplifier 8 any other power unit adapted to provide the desired compensation.

What I claim is:

1. A gravity meter comprising an AC generator including a vibrating wire having a stress produced by a mass, and a regeneration amplifier having an output frequency related to the actual stress in the wire which is a function of the value of gravity at the site of the mass and spurious acceleration of the mass, and electromechanical feedback means coupling the amplifier and mass for maintaining the frequency constant by cancelling that part of the stress that does not correspond to a reference value of gravity, said feedback means producing a DC voltage which is converted into mechanical force applied to said mass, the DC voltage being a linear combination of spurious accelerations and the difference between the value of gravity at the site of the mass and the reference value of gravity, and filter means to separate the value of spurious accelerations from the DC voltage to leave the gravity value difference.

2. A gravity meter as claimed in claim 1, wherein said electromechanical feedback means comprises a frequency discriminator connected to the output of the amplifier to leave that part of the amplifier output voltage which does not correspond to the reference value of gravity.

References Cited

UNITED STATES PATENTS

| | | | |
|---|---|---|---|
| 2,657,581 | 11/1953 | Fay | 73–382 |
| 2,674,885 | 4/1954 | Silverman | 73–382 |
| 2,809,524 | 10/1957 | Masterson | 73–382 |
| 3,071,974 | 1/1963 | Peterson | 73–517 |

JAMES J. GILL, Primary Examiner

HERBERT GOLDSTEIN, Assistant Examiner

U.S. Cl. X.R.

73—517